United States Patent
Sesha et al.

(10) Patent No.: US 11,665,099 B2
(45) Date of Patent: May 30, 2023

(54) SUPERVISED QUALITY OF SERVICE CHANGE DEDUCTION

(71) Applicant: HEWLETT PACKARD ENTERPRISE DEVELOPMENT LP, Houston, TX (US)

(72) Inventors: Madhusoodhana Chari Sesha, Bangalore (IN); Amogh Mahesh, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 58 days.

(21) Appl. No.: 17/506,663

(22) Filed: Oct. 20, 2021

(65) Prior Publication Data

US 2023/0120510 A1 Apr. 20, 2023

(51) Int. Cl.
*H04L 47/2441* (2022.01)
*H04L 47/127* (2022.01)
*H04L 47/33* (2022.01)

(52) U.S. Cl.
CPC ........ *H04L 47/2441* (2013.01); *H04L 47/127* (2013.01); *H04L 47/33* (2013.01)

(58) Field of Classification Search
None
See application file for complete search history.

(56) References Cited

U.S. PATENT DOCUMENTS

| 2004/0125797 | A1* | 7/2004 | Raisanen | H04L 63/1466 370/392 |
| 2021/0374614 | A1* | 12/2021 | Sampaio | G06F 16/285 |
| 2022/0369153 | A1* | 11/2022 | Manja Ppallan | H04W 28/0268 |

\* cited by examiner

*Primary Examiner* — Anh Ngoc M Nguyen
(74) *Attorney, Agent, or Firm* — Sheppard Mullin Richter & Hampton LLP

(57) ABSTRACT

Systems and methods are provided for monitoring traffic flow using a trained machine learning (ML) model. For example, in order to maintain a stable level of connectivity and network experience for the devices in a network, the ML model can monitor the data flow of each device and label each data flow based on its behavior and properties. The system can take various actions based on the labeled data flow, including generate an alert, automatically change network settings, or otherwise adjust the data flow from the device.

20 Claims, 6 Drawing Sheets

| 310 Average packet size | Variability of packet size | Inter-packet delay | Average payload size | Rate of packet transmission |
|---|---|---|---|---|
| 1 kb | 0.1 kb | 1 ms | 1.5 kb | 1 Mpps |

| 320 Current packet size | Variability of packet size | Inter-packet delay | Average payload size | Rate of packet transmission |
|---|---|---|---|---|
| 1.2 kb | 0.1 kb | 1.4 ms | 1.6 kb | 0.8 Mpps |

| 330 Current packet size | Variability of packet size | Inter-packet delay | Average payload size | Rate of packet transmission |
|---|---|---|---|---|
| 1 kb | 0.1 kb | 2 ms | 1.6 kb | 1 Mpps |

FIG. 3

SUPERVISED QUALITY OF SERVICE CHANGE DEDUCTION

BACKGROUND

The amount of data created and consumed is increasing rapidly. In particular, annual data creation increased from 1.2 zettabytes (trillion gigabytes) to an estimated 60 zettabytes from 2010 to 2020. Data is expected to proliferate at ever increasing rates due in part to the rise of remote work and remote applications. In 2025, an estimated 180 zettabytes of data is projected to be created. The burgeoning of data has been a catalyst causing an increased urgency to increase performance, capacity, and reliability across a communication network, yet the methods of creating this increased capability are difficult to implement across multiple communication networks.

BRIEF DESCRIPTION OF THE DRAWINGS

The present disclosure, in accordance with one or more various examples, is described in detail with reference to the following figures. The figures are provided for purposes of illustration only and merely depict typical examples.

FIG. 3 is an illustrative data set comparing data flows, according to examples described in the present disclosure.

Figure 1:
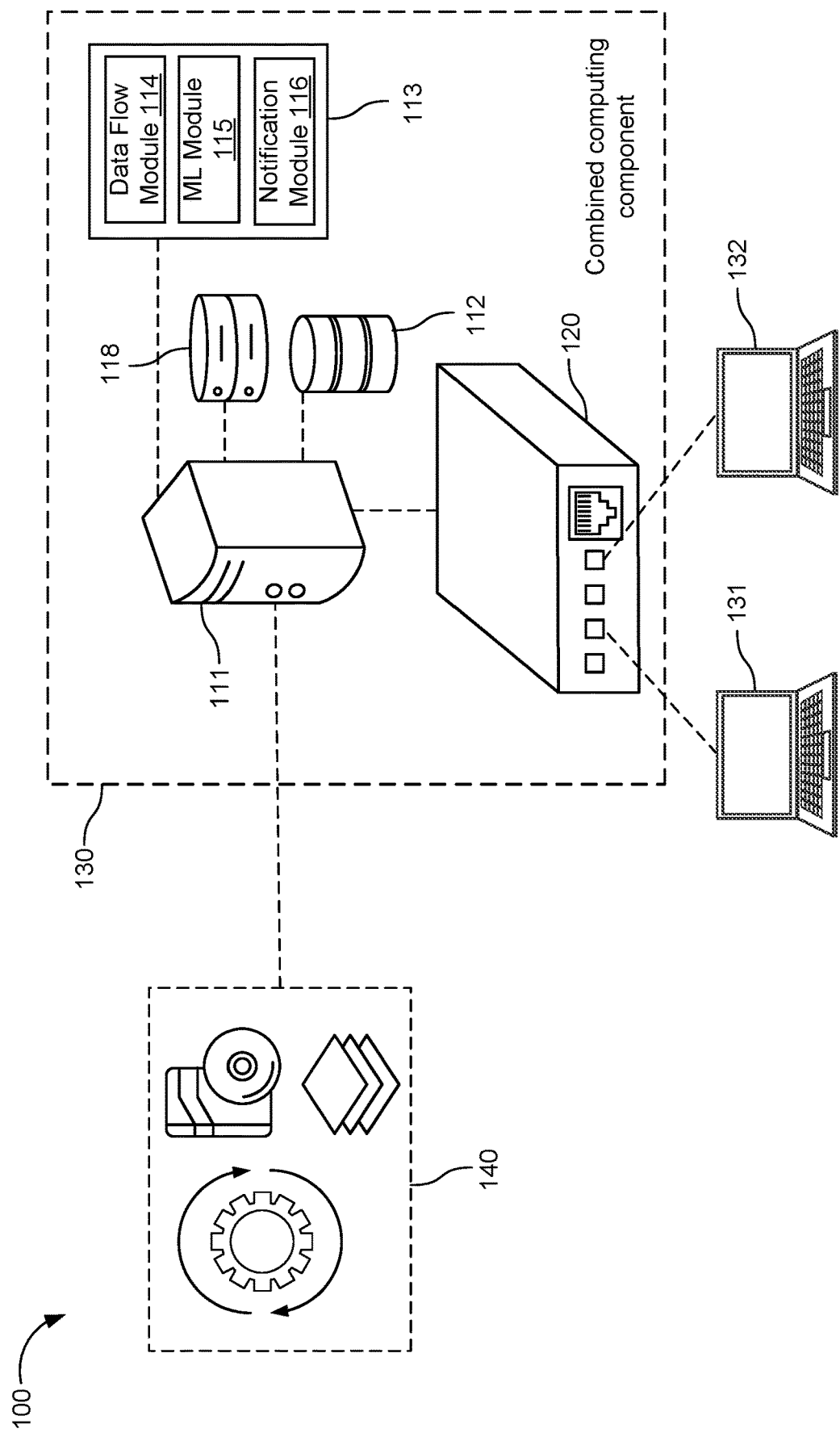
FIG. 1 is an exemplary illustration of a computing system that monitors data flow using a trained machine learning (ML) model, according to examples described in the present disclosure.

The figures are not exhaustive and do not limit the present disclosure to the precise form disclosed.

DETAILED DESCRIPTION

Traditionally, wide area networks (WANs) have bridged gaps between multiple local area networks (LANs), particularly because LANs typically reside in different geographical locations. WANs rely on hardware network devices such as routers to prioritize transmission of data, voice, and video traffic between LANs. In these traditional communication networks, various devices are implemented: e.g., internet of things (IoT) devices, switches, hubs, virtual machines, etc. Generally, the more devices that are implemented within a communication network, the more data traffic is present.

Examples provided in the present application discuss monitoring data flow of these distributed communication networks using a trained machine learning (ML) model. For example, in order to maintain a stable level of connectivity and network experience for the devices in a communication network, the ML model can monitor the data flow of each device (e.g., a plurality of data packets transmitted from a source computer as a stream of data) over a period of time (e.g., predetermined time range or adjusted dynamically) and label each data flow based on its behavior (e.g., a labeled data flow). The system can generate and/or send an alert, for example, to request further action be taken to resolve an expected issue(s). Use of the ML model can allow for faster detection of issues and the ability to pinpoint the device that caused the issue(s), leading to accelerated troubleshooting.

The data flow can identify behaviors of individual data packets, including a quality of service (QoS) value or other identifying information. The QoS value may correspond with a measurement of the overall performance of a service (e.g., a cloud computing service), particularly the performance experienced by users of the communication network. To quantitatively measure QoS, several related aspects of the network service may be considered, such as data flow behaviors like packet loss, bit rate, throughput, transmission delay, availability, or jitter. In packet-switched networks, QoS is affected by various factors, which can be divided into human and technical factors. Human factors can include: stability of service quality, availability of service, waiting times, and user information. Technical factors can include: reliability, scalability, effectiveness, maintainability, and network congestion.

In typical data packet transmission, a QoS value may be added to each data packet by an application at an end user device and dictate an amount of bandwidth or other system resources that can be used to transmit the data packets along the data flow. However, there are instances where the data flow behaviors do not match the behaviors which the QoS value represents (e.g., mismatched). This can happen because of multiple reasons, like an inherent bug in the application browser, a change by the user itself, a network delay, a backdoor firmware update, or even rogue data packets being sent with the expected data flow.

As such, even though some data packets may include a QoS value, the QoS value may be incorrect based on the behaviors of the data flow. Examples of the application may update the QoS value by correlating the behaviors of the data flow with stored labels corresponding with QoS values using a trained machine learning (ML) model (e.g., a supervised learning method). These behaviors may include packet length, inter-packet arrival time, QoS value, source or destination IP address, MAC address, and the like. When the behaviors of the data packet are correlated with the stored QoS value, the system may determine label (e.g., to label the data flow) and/or updated QoS value (e.g., QoS1, QoS2, or QoS3 to be used as a label for the data flow), where the higher the updated QoS value corresponds with a lower quality of the data flow. The updated QoS value of each device may be compared with a stored QoS value for that particular device, and when the updated QoS value does not match its stored QoS value, the system can determine that an issue exists with the particular data flow and/or device.

Technical improvements are realized throughout the disclosure. For example, various entities and data centers connecting different types of devices may rely on a wrongly identified QoS value, which can lead to a mismanaged experience and no alerts to fix the issue. These issues may be incorrectly blamed on network infrastructure and the bandwidth (e.g., when the issue is actually a bug in the application browser, a change by the user itself, a network delay, a backdoor firmware update, rogue data packets being sent with the expected data flow). By using a more accurate QoS value or label, more accurate issues can be remediated at a device that is causing or contributing to the issue. Various network issues can be determined at multiple network devices (e.g., switches) in the communication network individually to pinpoint the issue in real time, leading to accelerated troubleshooting. Additionally, the reduction in network issues can improve network communications and data flows across the network.

FIG. 1 is an exemplary illustration of a computing system 100 that monitors data flow using a trained ML model. In this illustration, computing system 100 may comprise platform 140, computing component 111, and network device 120.

Platform 140 may deploy services, such as physical network and Virtual Network Function (VNF) services, particularly in rapidly growing fields such as telecommunications and next generation communications. The deployment may be regulated by policies, such as rules or protocols to instantiate or de-instantiate configurations, conditions, requirements, constraints, attributes, and/or needs regarding the entities within the platform. The policies may further include mechanisms to provision, maintain, deploy, test, delete, and/or retire the entities.

In some examples, combined computing component 130 may implement functions of both computing component 111 and network device 120. For example, computing component 111 may be embedded within network device 120, or computing component 111 may be implemented as a stand-alone device separate from network device 120 and implemented as a service to network device 120. In a large network environment, a plurality of network devices 120 may include computing component 111 and/or access the service remote from plurality of network devices 120. Either implementation will not divert from the essence of the disclosure.

Computing component 111 may include one or more hardware processors that carry out tasks to implement or supplement policies of platform 140 and/or network device 120. For example, computing component 111 may include a server, such as a remote server. In some examples, the tasks may include, for example, transmitting a data flow (e.g., stream of data packets) across a communication network via network device 120 that originates from client devices 131 and/or 132. Although only two client devices are shown for the sake of illustration, any number of client devices may be connected to the communication network.

Network device 120 may include a switch, router, and/or gateway within any type of network, including a telecommunications or next generation communication network. The data flow originating from client devices 131 and/or 132 and transmitted via network device 120 may be captured and monitored using one or more tools embedded with network device 120.

The data flow may be received over a period of time (e.g., predetermined time range or dynamically adjusted time range). When the time range for tracking the data flow is dynamically adjusted, the start and end time of the time range may be limited based on packet similarities between identification information for the packets. For example, the data flow may be processed to extract multiple behaviors of each data flow, including for example packet length, inter-packet arrival time, QoS, source and destination IP, MAC address, and other properties. Any one of these behaviors may be used as identification information of the data flow. The behaviors may be analyzed to determine the data flow behaviors having different QoS classes and classify them accordingly.

In some examples, each subset of data flows may be identified during the dynamic time range so that the packets received in the time range include identical identification information above a threshold value (e.g., more than five matching characters or digits, or a source device with the same port across multiple data flows). In some examples, the threshold value is zero or the data flows may match exactly between the source IP (e.g., 10.0.0.1), destination IP (e.g., 20.0.0.1), source port (e.g., 1025), destination port (e.g., 15345), or other identification information. When identical identification information ceases (e.g., the identification information for new packets is different than the previous packets), the dynamic time range may end.

Figure 2:
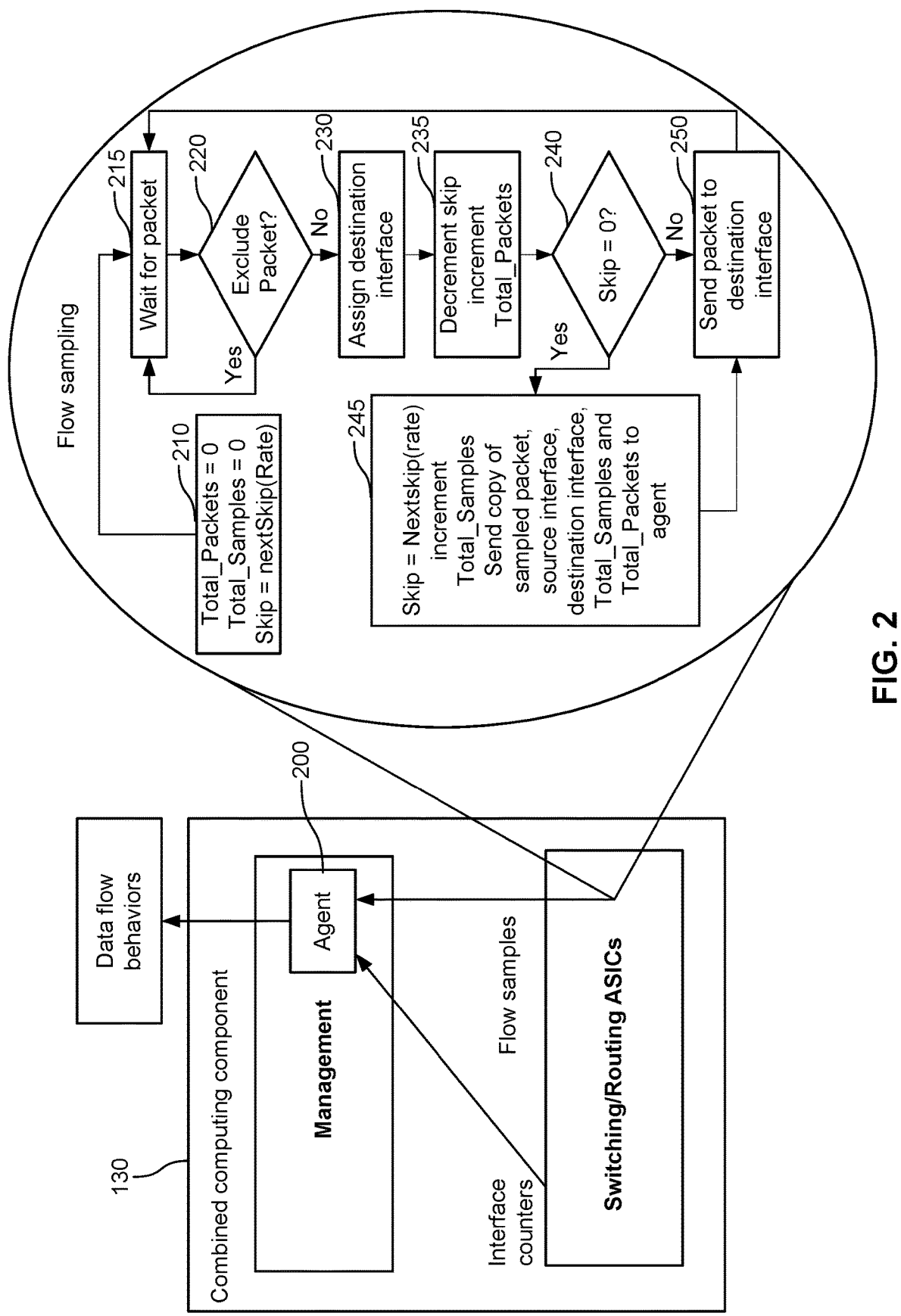
FIG. 2 illustrates a network device, computing component, and/or combined computing component for determining one or more data flow behaviors, according to examples described in the present disclosure.

Additional detail associated with data flow is provided with FIG. 2. FIG. 2 illustrates a network device 120, computing component 111, and/or combined computing component 130 for determining one or more data flow behaviors. Packet sampling may be performed by the switching/routing portion of an application-specific integrated circuit (ASIC) using agent 200. The state of the forwarding/routing table entries associated with each sampled packet may also be recorded (e.g., in database 112). Any of these devices (e.g., network device 120, computing component 111, or combined computing component 130) may implement agent 200 without diverting from the essence of the disclosure.

In some examples, a data packet may be transmitted from client device 131 to combined computing component 130, where a data flow sampling process is initiated. The data flow sampling process may capture one or more data packets from the stream of data transmitted via the network from client device 131 and analyze the behaviors of the data flow for a period of time (e.g., ten seconds, five minutes).

At block 210, during the data flow sampling process, one or more variables may be initialized, including a "total number of packets" set to zero and a "total number of samples" set to zero.

At block 215, the data flow sampling process may wait for a data packet to be transmitted from a network device (e.g., from client device 131).

At block 220, when a packet is received, the data flow sampling process may determine whether to exclude the packet or not (e.g., based on predetermined rules stored with computing component 130). If yes, the process may return to block 215. If not, the process may proceed to block 230.

At block 230, when the packet is not excluded, the data flow sampling process may assign a destination interface and increment the "total number of packets" value by one. For example, typical packet processing may receive a packet at the network device from an input interface, process the packet, and then assign the packet to a destination interface.

At block 235, the data flow sampling process may decrement a "skip" value by one.

At block 240, the data flow sampling process may analyze the skip value to determine whether the skip value has reached zero. If yes, the process may proceed to block 245. If not, the process may proceed to block 250.

At block, 245, the "skip" value reaches zero, the "total number of samples" value is incremented and a copy of the sampled packet, source interface, destination interface, "total number of samples" value, and "total number of packets" value may be transmitted to agent 200.

At block 250, the "skip" value is not zero, the data packet may be sent to the destination interface until a next packet is received (e.g., block 215).

When the data flow sampling process provides the packet information to agent 200, agent 200 may package data into datagrams. For example, agent 200 can combine interface counters and data flow samples into one or more datagrams. Datagrams may correspond with a data structure or data format organizing the sample data, counter data, and flow data.

The packaged datagrams may be transmitted immediately to one or more devices to help reduce latency associated with agent 200. For example, the one or more datagrams may be transmitted on the network to a central collector component. In some examples, the central collector component may perform further analytics on the data that are outside of the scope of this disclosure.

When the datagrams are received at the central collector component, the central collector may analyze the datagrams to produce a real-time, networkwide view of data flows. The datagrams may include packet header, switching, and/or routing information to permit detailed analysis of Layer 2 (e.g., MAC address layer), Layer 3 (e.g., IP address layer), through Layer 7 (e.g., application layer) data flows.

Returning to FIG. 1, computing component 111 may implement one or more components or engines on behalf of network device 120, including logic 113 in computer readable media, that implements instructions to carry out the functions of the computing component 111. Logic 113 comprises one or more modules, including data flow module 114, machine learning (ML) module 115, and notification module 116.

Data flow module 114 is configured to receive and/or monitor the data flow. The monitoring of data flow may be implemented using various methods described throughout the disclosure, including those implemented by agent 200 in FIG. 2. For example, logic 113 is configured to receive a data flow from network device 120, where the data flow comprises one or more behaviors and identification information.

ML module 115 is configured to train a machine learning (ML) model implemented by computing component 111 (e.g., a supervised learning method). In other words, the data flow may be used as a baseline to train the ML model. When new data flows are received, information associated with the new data flows may be provided to the trained ML model to produce an output. When the trained ML model is a supervised learning model, the output may correspond with classifications of the data flow (e.g., an updated QoS value or a labeled data flow).

ML module 115 is also configured to compare the output of the trained ML model with the received QoS value to help determine if the new, incoming network traffic is marked with a correct QoS value. When the two values differ, ML module 115 may identify a mismatch. The number of labeled data flows that mismatch the stored label may be aggregated to an amount of labeled data flows. The amount of labeled data flows may correspond with the labeled data flows that do not include the identical identification information in the packet data.

FIG. 3 is an illustrative data set comparing data flows, according to examples described in the present disclosure. As illustrated, three data flows are provided, each of which may be received by ML module 115. Each data flow comprises one or more behaviors (e.g., average packet size, variability of packet size, inter-packet delay, average payload size, or rate of packet transmission) of the data stream (e.g., audio or video) that is transmitted within the data flow.

At row 310, a data flow corresponding with baseline parameters are provided. The baseline parameters may correspond with a stored QoS value. This data flow and its corresponding behaviors may be provided to ML module 115 during the training phase, in addition with other baseline data flows corresponding with other QoS values. The training may help identify the one or more behaviors of the baseline data flow that may teach the ML model of ML module 115 how to correlate behaviors of the data flow with each particular QoS value.

Once the ML model is trained, new data flows may be received and provided as input to the trained ML model of ML module 115. The output may classify or reclassify the new data flow with the appropriate QoS value and/or label based on the measured parameters.

At row 320, the data flow may deviate from the baseline by more than a threshold value (e.g., 10%) on more than a threshold proportion of the parameters (e.g., 50%). When the incoming QoS value matches the baseline data flow, ML module 115 may identify a mismatch between the stored label and the actual behaviors of one or more packets in the labeled data flow. In other words, three out of five parameters (e.g., 60%) differ by more than the threshold value (e.g., 10%), so row 320 constitutes a mismatch.

A mismatch may be determined using other methods as well. For example, if one parameter deviates by more than a second threshold proportion (e.g., 50%), then the data flow may automatically be classified as a mismatch between the stored label and the actual behaviors of one or more packets in the labeled data flow. This concept is illustrated at row 330.

At row 330, the data flow may be received. In this example, one of the attributes does deviate by more than the second threshold proportion (e.g., 50%) and the data flow may be identified as a mismatch. In this example, it may not matter that the other attributes closely match when the single parameter is more than the second threshold proportion.

The training of the ML model by ML module 115 may be implemented using various methods. For example, the learning may implement a decision tree (DT) (e.g., non-parametric supervised learning method used for classification and regression). The DT may help create a ML model that predicts the value of a target variable by learning decision rules inferred from the data features. For example, decision trees can learn from data to approximate a sine curve with a set of if-then-else decision rules. The deeper the tree, the more complex the decision rules and the fitter the model.

In another example, the training may implement a random forest, randomized decision tree, or other averaging algorithm. In these examples, each tree may be built from a sample drawn with replacement (i.e., a bootstrap sample) from the training data set. When splitting each node during the construction of a tree, the split may be found either from all input features or a random subset of the maximum number of features. Each time the process splits the nodes during construction of the tree, the process may decrease the variance of the forest estimator in the algorithm without overfitting the training data set. By taking an average of the predictions, some errors can be removed. Random forests may achieve a reduced variance by combining diverse trees.

ML module 115 may use the trained ML model to assign one or more labels to the data flow according to the QoS value based on behaviors of the data flow. In other words, the output of the trained ML model may classify one or more subsets of the data flow. In some examples, the ML model is a self-supervised learning model that analyzes the data to determine behaviors of the data flow and the label (e.g., QoS). The behaviors and label/QoS may be used to train the ML model. The trained ML model is later used to predict future data flow labels/QoS, based on behaviors.

An illustrative example of the training data and corresponding label is provided in Table 1. Once the ML model is trained, the data flow information can be provided as input to the trained ML model. An illustrative example of the classification data and corresponding label output is provided in Table 2.

TABLE 1

| Data | Label |
| --- | --- |
| Data Flow Behaviors | QoS |

TABLE 2

| Data | Predict Label |
| --- | --- |
| Data Flow Behaviors | (e.g., determine a QoS) |

As an illustrative example, the label may correspond with, for example, QoS1, QoS2, QoS3, where the higher the updated QoS value or label corresponds with a lower quality of the data flow. However, any sorted labeling scheme may be implemented without diverting from the essence of the disclosure.

The label or new QoS value may be determined for the entire data flow or a subset of the data flow comprising one or more of a plurality of subsets. In other words, once the model is trained, a unique set of behaviors may be applied by ML module 115 to the entire data flow or a subset of the data flow to determine the corresponding QoS classification. This set of behaviors may be implemented with the trained ML model to help the system uniquely identify future data packets that correspond with that QoS class. Using this learning, ML module 115 can classify new incoming traffic.

As an illustrative example, a new data flow is received and provided to the trained ML model that has learned the classification for different types of QoS values. The behaviors of the new data flow are extracted and passed through the decision tree implemented by the trained ML model of ML module 115.

Data flow module 114 is also configured to compare the labeled data flow to a stored label corresponding to the identification information of the data flow, where the stored label is stored in database 112. If there is a match between expected classification and actual QoS value, data flow module 114 may determine that the QoS value provided by the sender is correct. Whenever there is a mismatch, data flow module 114 may store the data flow, behavior, initial QoS value, and generated label (e.g., a new QoS value) in database 112 or other log file.

Data flow module 114 may also increment the frequency of misclassifications of the QoS value in a log file or database as a misclassification counter value (e.g., database 112). The frequency of misclassifications may help detect the number of data flows that are deviating from the desired QoS value. For example, the data flow may be monitored and analyzed for one or more periods of time to determine a first data flow and a second data flow. The first data flow (e.g., the first minute of an audio stream) from the data stream may correspond with a first QoS value and a second data flow (e.g., the second minute of an audio stream) may correspond with a second QoS value. When the first QoS value is a mismatch from the determined label or updated QoS value (from the ML model), the frequency of misclassification counter value may be incremented.

In some examples, both the first QoS value and the second QoS value may differ from the determined label or updated QoS value, but at different magnitudes. When a mismatch is identified between the received QoS value and the determined QoS value and/or generated label, a log file may be updated to identify the mismatches. The log file may contain record details, flow identifier (ID), QoS value, behaviors of the data flow, a classification counter value, a misclassification counter value, or other relevant information to the data flow analysis. A classification counter value may be incremented to identify an aggregated amount of matches between determined QoS values and received QoS values. A misclassification counter value may be incremented corresponding with the mismatch of these QoS values. This can help identify an aggregated amount of mismatches in QoS values that the system is experiencing.

In some examples, the misclassification counter value may be compared with a configurable threshold value. When the misclassification counter value exceeds the threshold value, various actions may be implemented. For example, data flow module 114 can generate a new log. In other examples, an alert may be transmitted to an administrative user to identify a large number of misclassified data flows (e.g., by notification module 116). The administrative user can use the alert to investigate the possible reasons for the misclassifications, lower a plurality of QoS values, and the like.

Figure 4:
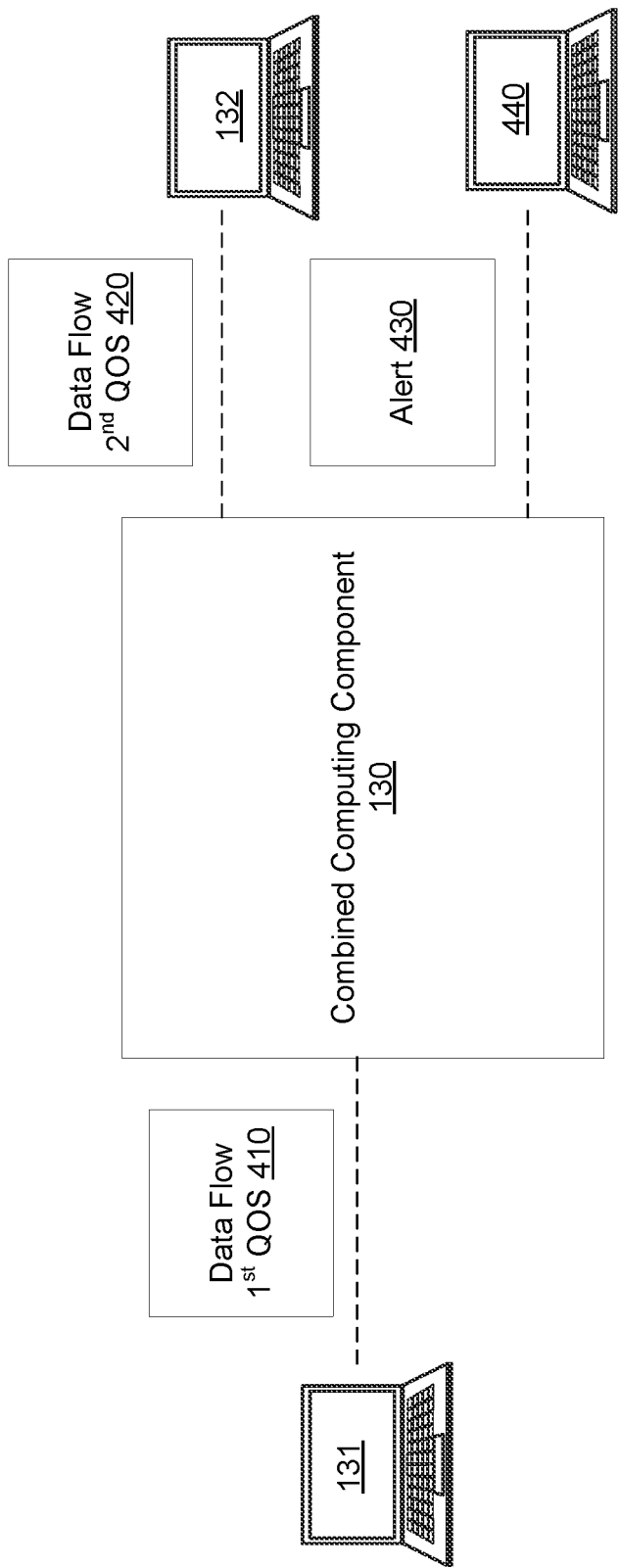
FIG. 4 illustrates various alerts transmitted when a labeled data flow does not match a stored label, according to examples described in the present disclosure.

Notification module 116 may selectively generate and/or send an alert to another location in the network. The alert may be generated in response to the labeled data flow not matching the stored label, as illustrated in FIG. 4.

For example, a first client device 131 may transmit a data packet with a first QoS value 310 to combined computing component 130 (e.g., network device 120 or computing component 111). Combined computing component 130 may provide components of the data packet to a trained ML model to determine a classification for the data packet to produce a label and/or updated QoS value. When the label and/or updated QoS value does not match the stored label associated with data packet with the first QoS value 410, then an updated label and/or QoS value may be created and included with the data packet 420 along the data flow. The updated data packet 420 may be transmitted to its destination, a second client device 132, and an alert 430 may also be generated based on the mismatched QoS values. The alert 430 may be transmitted to an administrative user to further analyze the data flow behaviors or other issues with the communication network.

In some examples, notification module 116 may generate a notification with an update to the predetermined label. The predetermined label can correspond with the identification information of the data flow and the labeled data flow that is stored in database 112.

In some examples, notification module 116 may initiate an automated process to change network settings in response to the mismatched or mislabeled data flow. The automated process may reroute future data flows that correspond with the same behaviors and/or identification information as the mismatched data flow from a first network device destination to a second network device destination. In another example, notification module 116 may drop the data flows that correspond with the same behaviors as the mismatched data flow (e.g., do not send to a destination address).

Computing component 111 may be communicatively coupled with one or more memory or storage devices, including database 112 and cache 118. Database 112 may comprise various information associated with the data flow, including a stored label corresponding to the identification information of the data flow and/or the labeled data flow itself.

Cache 118 may be embedded within or otherwise integrated into the computing component 111. Cache 118 may store a subset of data that is also stored within database 112, and/or data of different resources or services from those in database 112. In some examples, computing component 111 may persist or synchronize any modifications to database 112. When processing data flows, computing component 111 may search within cache 118 initially, and if the search within cache 118 fails to return adequate hits, computing component 111 may proceed to search within database 112. Computing component 111 may synchronize results discovered within database 112 to cache 118 by updating database 112 to incorporate any modifications that have not been persisted or synchronized.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5:
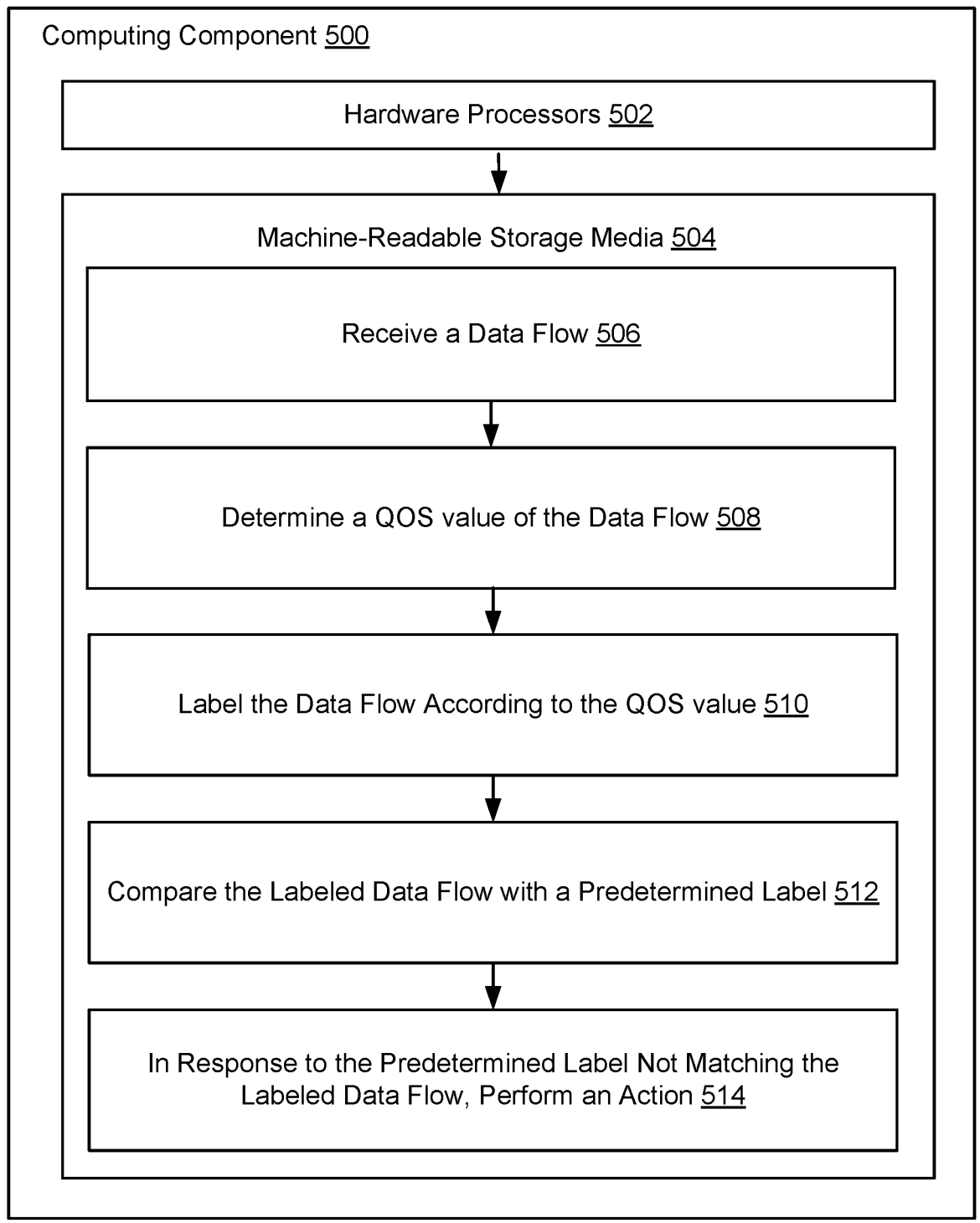
FIG. 5 is an example computing component that may be used to implement various features of examples described in the present disclosure.

FIG. 5 illustrates an example computing component that may be used to implement supervised quality of service (QoS) change deduction in accordance with various examples. Computing component 500 may be, for example, a server computer, a controller, or any other similar computing component capable of processing data. In the example implementation of FIG. 5, the computing component 500 includes a hardware processor 502 and machine-readable storage medium for 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-514, to control processes or operations for burst preloading for available bandwidth estimation. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-514.

Hardware processor 502 may execute instruction 506 to receive a data flow. For example, combined computer component 130 may receive a data flow from a device in the network, wherein the data flow comprises one or more behaviors and identification information.

Hardware processor 502 may execute instruction 508 to determine a QoS value of the data flow. For example, combined computer component 130 may determine the QoS value of the data flow based on the one or more behaviors of the data flow.

Hardware processor 502 may execute instruction 510 to label the data flow according to the QoS value. For example, combined computer component 130 may label the data flow according to the determined QoS value of the data flow.

Hardware processor 502 may execute instruction 512 to compare the labeled data flow with a stored label. For example, combined computer component 130 may compare the labeled data flow to a stored label corresponding to the identification information of the data flow, wherein the stored label is stored in the database.

Hardware processor 502 may execute instruction 514 to perform an action. The action may include, for example, generating or sending an alert, storing the labeled data flow in the database 112, initiating an automated process to change network settings, or automatically adjust the data flow from the second network device. For example, combined computer component 130 may selectively send the alert in response to the stored label not matching the labeled data flow.

Figure 6:
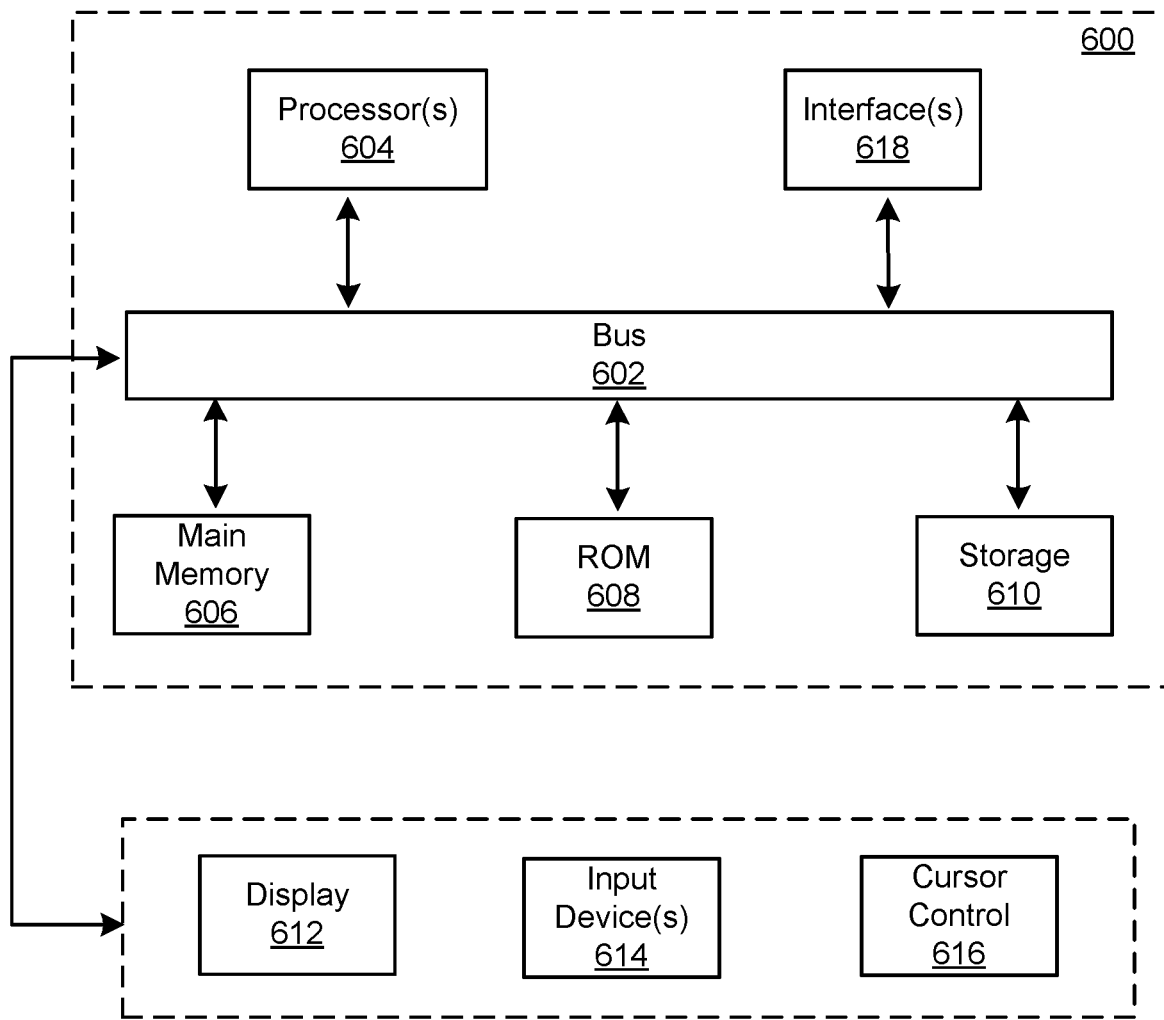
FIG. 6 depicts a block diagram of an example computer system in which various of the examples described herein may be implemented.

FIG. 6 depicts a block diagram of an example computer system 600 in which various of the examples described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some examples, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one example, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub- combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
   receiving, at a switch in a communication network, a data flow from a device in the communication network, wherein the data flow comprises one or more behaviors and identification information;
   determining a quality of service (QoS) value of the data flow based on the one or more behaviors of the data flow, wherein the QoS value of the data flow is determined by a trained machine learning (ML) model;
   labeling the data flow according to the determined QoS value of the data flow;
   comparing the labeled data flow to a stored label corresponding to the identification information of the data flow, wherein the stored label is stored in the database;
   determining if the labeled data flow matches the stored label;
   in response to the labeled data flow not matching the stored label, generating an alert; and
   storing the labeled data flow in the database.

2. The computer-implemented method of claim 1, further comprising:
   responsive to receiving the data flow from the device, determining a QoS value of a subset of the data flow, wherein the data flow comprises a plurality of subsets;
   labeling the subset of the data flow according to the determined QoS value of the subset;
   comparing the labeled subset of the data flow to the stored label corresponding to the identification information of the data flow;
   determining if the labeled subset matches the stored label; and storing the labeled subset in the database.

3. The computer-implemented method of claim 2, further comprising:
   determining a total of subsets that comprise the data flow; and
   determining an amount of labeled subsets that mismatch the stored label.

4. The computer-implemented method of claim 3, further comprising:
   determining a list of different labeled subsets among the total of subsets of the data flow.

5. The computer-implemented method of claim 1, further comprising:
   determining a total of data flows received over a period of time, wherein each data flow comprises an identical identification information; and
   determining an amount of labeled data flows that mismatch the stored label corresponding to the identical identification information.

6. The computer-implemented method of claim 5, further comprising:
   determining a list of different labeled data flows among the total of data flows received in the period of time.

7. The computer-implemented method of claim 1, wherein the generating the alert further comprises:
   generating a notification for the stored label, wherein the notification corresponds with the identification information of the data flow and the labeled data flow; and
   updating the alert with the notification.

8. The computer-implemented method of claim 1, wherein the generating the alert further comprises:
   initiating an automated process to change network settings in response to a mismatched or mislabeled data flow.

9. A system comprising:
   a memory; and
   one or more processors that are configured to execute machine readable instructions stored in the memory for performing the method comprising:
   receive a data flow from a second network device, wherein the data flow comprises one or more behaviors and identification information;
   determine a quality of service (QoS) value of the data flow based on the one or more behaviors of the data flow, wherein the QoS value of the data flow is determined by a trained machine learning (ML) model;
   label the data flow according to the determined QoS value of the data flow;
   compare the labeled data flow to a stored label corresponding to the identification information of the data flow, wherein the stored label is stored in the database;
   determine if the labeled data flow matches the stored label; and
   in response to the labeled data flow not matching the stored label, initiating an automated process to change network settings.

10. The system of claim 9, the one or more processors further configured to:
- determine a QoS value of a subset of the data flow, wherein the data flow comprises a plurality of subsets;
- label the subset of the data flow according to the determined QoS value of the subset;
- compare the labeled subset of the data flow to the stored label corresponding to the identification information of the data flow;
- determine if the labeled subset matches the stored label; and
- store the labeled subset in the database.

11. The system of claim 10, the one or more processors further configured to:
- determine a total of subsets that comprise the data flow; and
- determine an amount of labeled subsets that mismatch the stored label.

12. The system of claim 11, the one or more processors further configured to:
- determine a list of different labeled subsets among the total of subsets of the data flow.

13. The system of claim 9, the one or more processors further configured to:
- determine a total of data flows received in a duration, wherein each data flow comprises an identical identification information; and
- determine an amount of labeled data flows that mismatch the stored label corresponding to the identical identification information.

14. The system of claim 13, the one or more processors further configured to:
- determine a list of different labeled data flows among the total of data flows received in the duration.

15. The system of claim 13, wherein the automated process to change network settings is further to:
- reroute future data flows that correspond with the one or more behaviors or the identification information as the data flow from the second network device.

16. The system of claim 13, wherein the automated process to change network settings is further to:
- drop future data flows that correspond with the one or more behaviors or the identification information as the data flow from the second network device.

17. A non-transitory computer-readable storage medium storing a plurality of instructions executable by one or more processors, the plurality of instructions when executed by the one or more processors cause the one or more processors to:
- receive a data flow from a second network device, wherein the data flow comprises one or more behaviors and identification information;
- determine a quality of service (QoS) value of the data flow based on the one or more behaviors of the data flow, wherein the QoS value of the data flow is determined by a trained machine learning (ML) model;
- label the data flow according to the determined QoS value of the data flow;
- compare the labeled data flow to a stored label corresponding to the identification information of the data flow, wherein the stored label is stored in the database;
- determine if the labeled data flow matches the stored label; and
- in response to the labeled data flow not matching the stored label, automatically adjust the data flow from the second network device.

18. The non-transitory computer-readable storage medium of claim 17, the one or more processors further to: determine a QoS value of a subset of the data flow, wherein the data flow comprises a plurality of subsets; label the subset of the data flow according to the determined QoS value of the subset; compare the labeled subset of the data flow to the stored label corresponding to the identification information of the data flow; determine if the labeled subset matches the stored label; and store the labeled subset in the database.

19. The non-transitory computer-readable storage medium of claim 17, the one or more processors further to: determine a total of subsets that comprise the data flow; and determine an amount of labeled subsets that mismatch the stored label.

20. The non-transitory computer-readable storage medium of claim 19, the one or more processors further to: determine a list of different labeled subsets among the total of subsets of the data flow.

* * * * *